US012756968B2

(12) United States Patent
Sunohara et al.

(10) Patent No.: US 12,756,968 B2
(45) Date of Patent: Oct. 6, 2026

(54) ACTIVE NOISE CANCELLATION IN AN EAR-WEARABLE DEVICE USING A VIBRATION SENSOR

(71) Applicant: Starkey Laboratories, Inc., Eden Prairie, MN (US)

(72) Inventors: Masahiro Sunohara, Minneapolis, MN (US); Piero Rivera Benois, Bad Zwischenahn (DE); Thomas Burns, St. Louis Park, MN (US); Kyle Olson, St. Louis Park, MN (US); Jinjun Xiao, Chanhassen, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 189 days.

(21) Appl. No.: 18/890,962

(22) Filed: Sep. 20, 2024

(65) Prior Publication Data

US 2025/0113139 A1 Apr. 3, 2025

Related U.S. Application Data

(60) Provisional application No. 63/541,582, filed on Sep. 29, 2023.

(51) Int. Cl.
*H04R 1/10* (2026.01)

(52) U.S. Cl.
CPC .................................. *H04R 1/1083* (2013.01)

(58) Field of Classification Search
CPC .................................................... H04R 1/1083
See application file for complete search history.

(56) References Cited

U.S. PATENT DOCUMENTS

| | | | | |
|---|---|---|---|---|
| 5,410,605 | A | 4/1995 | Sawada | |
| 8,767,989 | B2 | 7/2014 | Burns | |
| 9,294,849 | B2 | 3/2016 | Burns | |
| 9,473,859 | B2 | 10/2016 | Burns | |
| 9,552,805 | B2 | 1/2017 | Lu | |
| 9,706,288 | B2 * | 7/2017 | Terlizzi | G10K 11/1783 |
| 10,880,657 | B2 | 12/2020 | Burns | |
| 11,223,915 | B2 | 1/2022 | McKinney | |
| 2022/0036878 | A1 | 2/2022 | Cyr | |
| 2022/0157434 | A1 | 5/2022 | Srour | |
| 2022/0355063 | A1 | 11/2022 | Fabry | |
| 2022/0386959 | A1 | 12/2022 | Georgiou | |
| 2022/0408200 | A1 | 12/2022 | Johnson | |
| 2023/0016667 | A1 | 1/2023 | Srour | |
| 2023/0188907 | A1 | 6/2023 | Bhowmik | |

(Continued)

*Primary Examiner* — Andrew Sniezek
(74) *Attorney, Agent, or Firm* — Mueting Raasch Group

(57) ABSTRACT

An ear-wearable device includes a receiver that produces sound into an ear canal and an inward-facing microphone determining sound pressure resulting from: the sound reproduced by the receiver into the ear canal; and acoustical noise leaking into the ear canal. A structural vibration sensor is coupled to detect at least one of body-induced vibrations and receiver-induced vibrations and produce a sensed vibration signal in response. A sound processor of the ear-wearable device is operable to determine an error signal from the inward-facing microphone and determine an active noise cancellation (ANC) signal based on the error signal. The vibration signal is used to reduce the impacts of vibrations on ANC processing within the ear-wearable device.

16 Claims, 12 Drawing Sheets

(56) References Cited

U.S. PATENT DOCUMENTS

| | | | |
|---|---|---|---|
| 2023/0247374 | A1 | 8/2023 | Mckinney |
| 2023/0370792 | A1 | 11/2023 | Jensen |
| 2023/0390608 | A1 | 12/2023 | Burwinkel |
| 2023/0396938 | A1 | 12/2023 | Vastare |

* cited by examiner

ACTIVE NOISE CANCELLATION IN AN EAR-WEARABLE DEVICE USING A VIBRATION SENSOR

RELATED PATENT DOCUMENTS

This application claims the benefit of U.S. Provisional Application No. 63/541,582, filed on 29 Sep. 2023, which is incorporated herein by reference in its entirety.

SUMMARY

This application relates generally to ear-level electronic systems and devices, including hearing aids, personal amplification devices, and hearables. In one embodiment, a hearing device includes an ear-wearable device having a receiver that reproduces sound into an ear canal and an inward-facing microphone. The inward-facing microphone determines sound pressure resulting from: the sound reproduced by the receiver into the ear canal; and acoustical noise leaking into the ear canal. The hearing device includes a structural vibration sensor structurally coupled to detect at least one of body-induced vibrations and receiver-induced vibrations and produce a sensed vibration signal in response. A sound processor of the hearing device is operatively coupled to the receiver, the inward-facing microphone, and the structural vibration sensor. The sound processor is operable to perform: determining an error signal from the inward-facing microphone; calculating an active noise cancellation (ANC) signal based on the error signal; subtracting the vibration signal from the ANC signal to form a modified ANC signal; and reproducing the modified ANC signal via the receiver into the ear canal.

In another embodiment, a hearing device includes an ear-wearable device having a receiver that reproduces sound into an ear canal and an inward-facing microphone. The inward-facing microphone determines sound pressure resulting from: the sound reproduced by the receiver into the ear canal; and acoustical noise leaking into the ear canal. The hearing device includes a structural vibration sensor structurally coupled to detect at least one of body-induced vibrations and receiver-induced vibrations and produce a sensed vibration signal in response. A sound processor of the hearing device is operatively coupled to the receiver, the inward-facing microphone, and the structural vibration sensor. The sound processor is operable to perform: determining an error signal from the inward-facing microphone; determining an active noise cancellation (ANC) signal based on the error signal and an adaptive filter; adjusting parameters of the adaptive filter based on the vibration signal to mitigate effects of vibration on ANC processing; and reproducing the ANC signal via the receiver into the ear canal.

In another embodiment, a hearing device includes an ear-wearable device having a receiver that reproduces sound into an ear canal and an inward-facing microphone. The inward-facing microphone determines sound pressure resulting from: the sound reproduced by the receiver into the ear canal; and acoustical noise leaking into the ear canal. The hearing device includes a structural vibration sensor structurally coupled to detect at least one of body-induced vibrations and receiver-induced vibrations and produce a sensed vibration signal in response. The hearing device includes a structural vibration actuator and one or more processors coupled to the receiver, the inward-facing microphone, the structural vibration sensor, and the structural vibration actuator. The one or more processors are operable to perform: determining an error signal from the inward-facing microphone; determining an active noise cancellation (ANC) signal based on the error signal; applying the ANC signal to an output signal sent to the receiver into the ear canal; determining a vibration cancellation signal based on the vibration signal; and applying the vibration cancellation signal to the structural vibration actuator.

In another embodiment, a method involves measuring calibration vibration signals via one or more structural vibration sensors for one or more users while the one or more users induce N-different body vibration sources. The calibration vibration signals are used to optimize a model that identifies N-isolated vibration signals corresponding to the respective N-different body vibration sources. The model is operated in an ear-wearable device. The ear-wearable device has an integrated structural vibration sensor that provides operational vibration signals to the model, the model providing an output in response to the operational vibration signals. The method further involves modifying an active noise cancellation (ANC) signal in the ear-wearable device based on the output of the model to mitigate effects of vibration of the ear-wearable device.

The FIGURES and the detailed description below more particularly exemplify illustrative embodiments.

BRIEF DESCRIPTION OF THE DRAWINGS

The discussion below makes reference to the following FIGURES.

The FIGURES are not necessarily to scale. Like numbers used in the FIGURES refer to like components. However, it will be understood that the use of a number to refer to a component in a given figure is not intended to limit the component in another figure labeled with the same number.

DETAILED DESCRIPTION

Embodiments disclosed herein are directed to an ear-worn or ear-level electronic hearing device. Such a device may include cochlear implants and bone conduction devices, without departing from the scope of this disclosure. The devices depicted in the figures are intended to demonstrate the subject matter, but not in a limited, exhaustive, or exclusive sense. Ear-worn electronic devices (also referred to herein as “hearing aids,” “hearing devices,” and “ear-wearable devices”), such as hearables (e.g., wearable earphones, ear monitors, and earbuds), hearing aids, hearing instruments, and hearing assistance devices, typically include an enclosure, such as a housing or shell, within which internal components are disposed.

Embodiments described herein relate to apparatuses and methods for providing active noise cancellation (ANC) in an ear-wearable device. Ear-wearable devices such as earbuds and hearing aids may include ANC processing to reduce the environmental noise that leaks into the ear canal. The ANC processing cancels unwanted noise inside the ear canal by generating a sound pressure signal with close to equal magnitude and opposite phase as the acoustic noise to be eliminated. This inverse sound pressure signal is sometimes referred to as "anti-noise."

In general, ANC for hearing aids and earbuds attempts to output a large amplitude signal through the receiver (also referred to as a loudspeaker or acoustic transducer) when a large level of acoustic noise signal is measured by the error microphone. If the dynamic range of the receiver is not sufficient, audible noise/artifacts due to saturation can occur. In addition, while attempting to output a large amplitude signal through the receiver, the electrical current consumed by the receiver increases. If the power supply system of the receiver drive system is insufficient, the voltage applied to the receiver may become unstable and generate audible noise/artifacts. In embodiments described here, an ear-wearable device employs a structural vibration sensor that can address these and other ANC issues.

Figure 1:
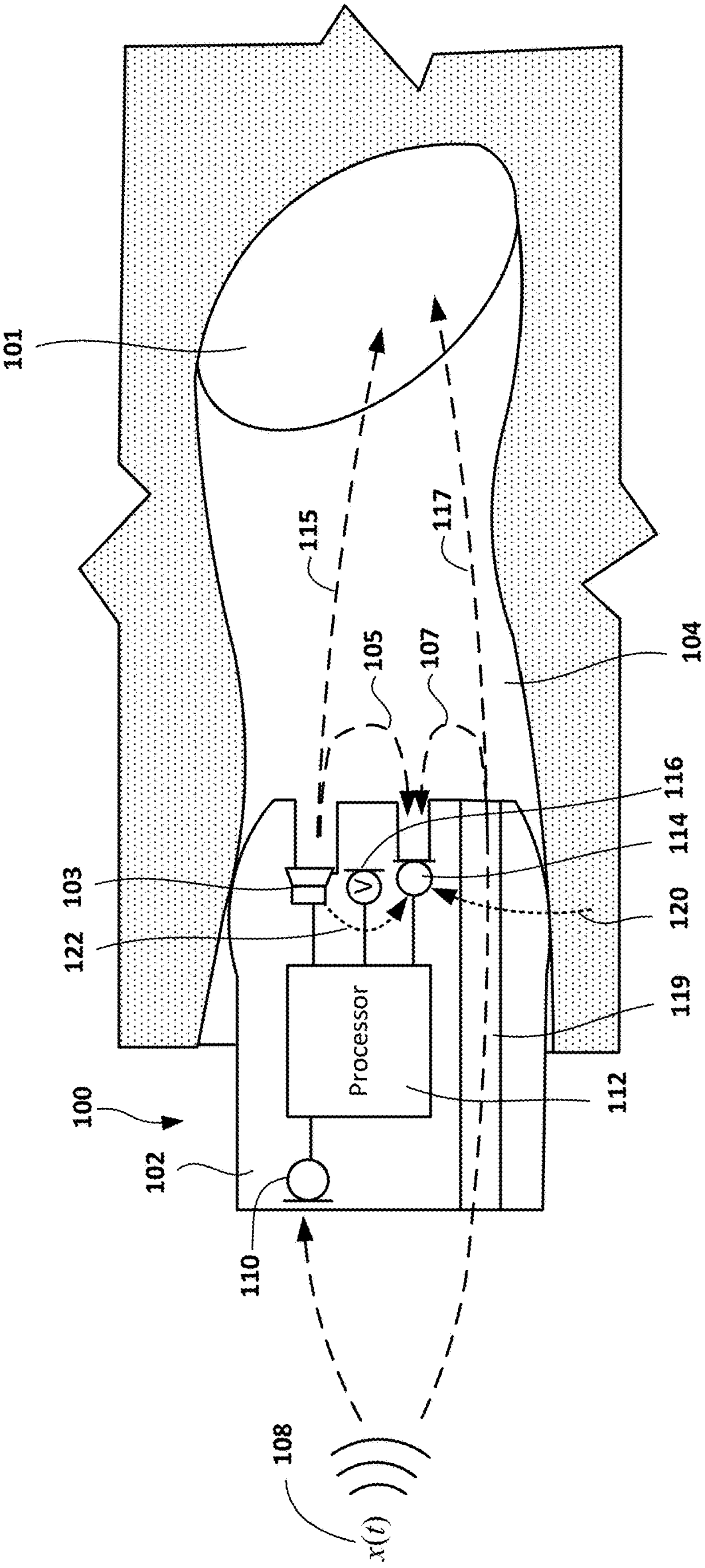
FIG. 1 is an illustration of a hearing device in an ear canal according to an example embodiment.

In FIG. 1, a diagram illustrates an ear-wearable device 100 according to an example embodiment. The ear-wearable device 100 includes an in-ear portion 102 that fits into the ear canal 104 of a user/wearer. The ear-wearable device 100 may also include an external portion (not shown), e.g., worn over the back of the outer ear. The external portion, if used, is electrically and/or acoustically coupled to the internal portion 102. The in-ear portion 102 may include an acoustic transducer 103, which may be referred to herein as a "receiver," "loudspeaker," etc., and in some embodiments could include a bone conduction transducer. In some embodiments the acoustic transducer may be in an external portion, where it is acoustically coupled to the ear canal 104, e.g., via a tube. The acoustic transducer 103 generates sound which vibrates the eardrum 101.

The ear-wearable device 100 includes an external microphone 110, which picks up sound from an external source 108. The device 100 also includes an internal microphone 114 that detects sound inside the ear canal 104. The internal microphone 114 may also be referred to as an inward-facing microphone or error microphone. Other components of hearing device 100 may include a processor 112 (e.g., a digital signal processor or DSP), memory circuitry, power management and charging circuitry, one or more communication devices (e.g., one or more radios, a near-field magnetic induction (NFMI) device), one or more antennas, buttons and/or switches, for example. The hearing device 100 can incorporate a long-range communication device, such as a Bluetooth® transceiver or other type of radio frequency (RF) transceiver.

While FIG. 1 shows one example of a hearing device, often referred to as a hearing aid (HA), the term "hearing device" or "ear-wearable device" in the present disclosure may refer to a wide variety of ear-level electronic devices that can aid a person with or without impaired hearing. This includes devices that can produce processed sound for persons with normal hearing. Hearing devices include, but are not limited to, behind-the-ear (BTE), in-the-ear (ITE), in-the-canal (ITC), invisible-in-canal (IIC), receiver-in-canal (RIC), receiver-in-the-ear (RITE) or completely-in-the-canal (CIC) type hearing devices or some combination of the above. Throughout this disclosure, reference is made to a "hearing device" or "ear-wearable device," which is understood to refer to a system comprising a single left ear device, a single right ear device, or a combination of a left ear device and a right ear device.

An ear-wearable device can use the inward-facing microphone 114 for ANC processing. Generally, the inward-facing microphone 114 is designed to monitor the acoustic sound signal in the ear canal 104. The sounds detected in the ear canal 104 by the inward-facing microphone 114 may originate from multiple sources. As indicated by acoustic path 105, there is coupling between the acoustic transducer 103 and the inward-facing microphone 114, often referred to as the secondary path. As indicated by acoustic path 107, external sound enters through the ear canal, e.g., via an optional vent 119 and/or leakage between the device 100 and the ear canal 104. As indicated by paths 115, 117 the eardrum can also detect these sounds.

Generally, the inward facing microphone 114 produces an electrical signal transduced via acoustic paths 105, 107. The processor 112 attempts to determine the characteristics of unwanted sounds, e.g., path 117, as perceived by the user at the eardrum 101. The processor creates an anti-noise signal which is combined with the source signals input to the acoustic transducer 103, which allows sound along path 115 to be relatively unchanged while noise along path 117 is reduced and ideally rendered inaudible.

The inward-facing microphone 114, with an acoustical conduit to the ambient field, is designed to sense acoustic pressure perturbations through the air. The inward-facing microphone 114 is also sensitive to vibroacoustic noise via structural or mechanical paths. In FIG. 1 and elsewhere, the vibrational paths are drawn with dotted lines to distinguish from the acoustic paths, which are drawn with dashed lines. The vibrational paths include path 120, which is from the human body to the microphone 114, and path 122, which is from the acoustic transducer 103 to the inward facing microphone 114. These paths are relevant at least in the low frequencies because the vibration sensitivity of the microphone 114 increases with decreasing frequency of the vibration.

Figure 2:
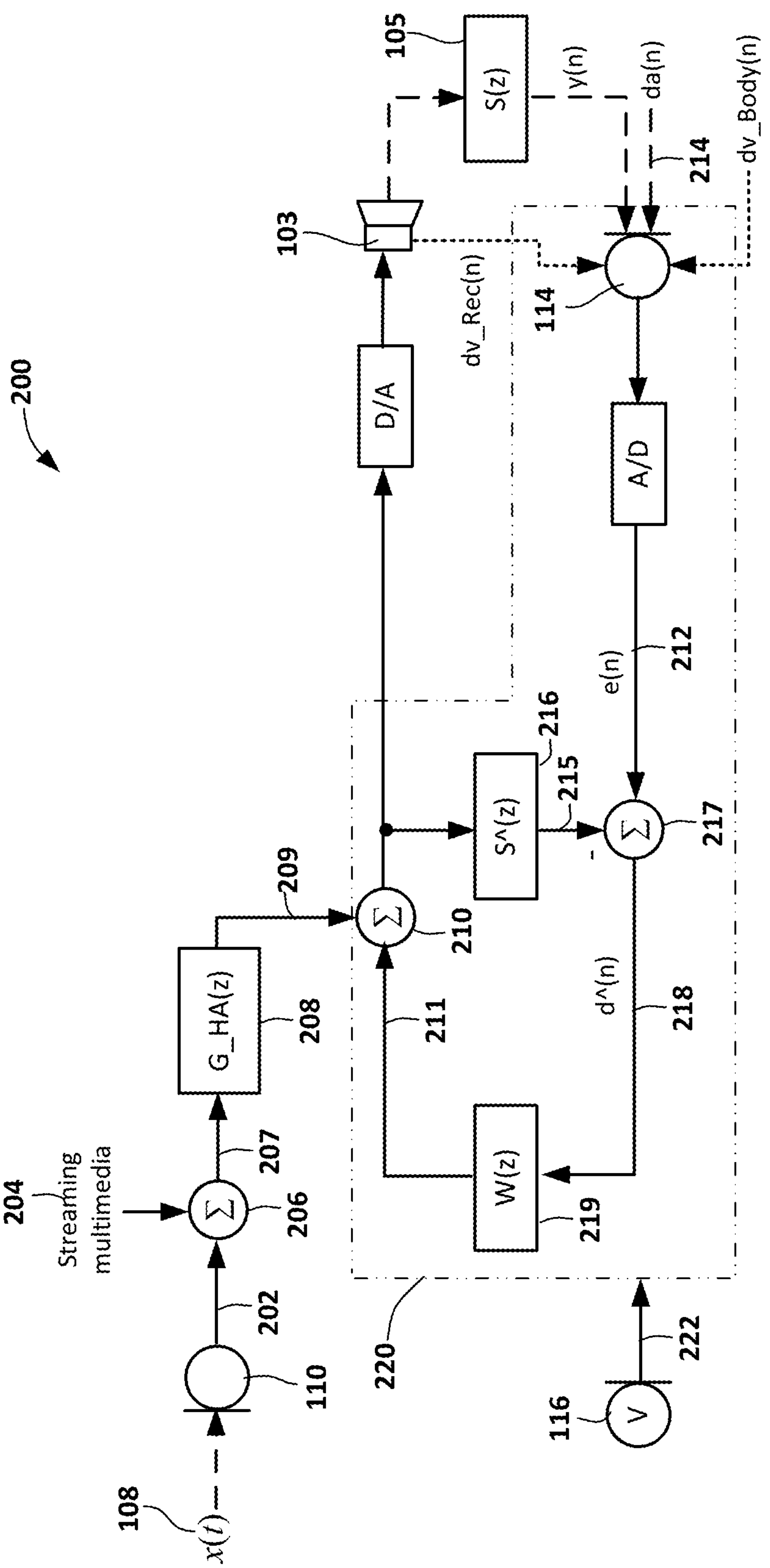
FIG. 2 is a block diagram of an active noise cancellation processing path according to an example embodiment.

Several kinds of human movements such as walking, chewing, shaking head, etc. produce very low frequency vibration components (e.g., below 20 Hz), which are picked up by the inward-facing microphone 114 as sensed vibration signal (dv_Body), which is shown in the diagram of FIG. 2. Also, when the receiver 103 is pumping out a strong cancellation signal, the receiver 103 can be a vibration source as well even when the user is not producing body-type vibrations. The vibrations produced by the receiver 103 (dv_Rec) are also shown in FIG. 2.

One issue when dealing with these vibration sources is the rather large amplitudes of low-frequency vibrations. When a vibration signal of such large amplitude is input to the ANC system, the ANC system will attempt to cancel it by outputting a signal with equally large amplitude, which may cause audible unwanted noise/artifacts. When the vibration is well below a frequency that humans can perceive (e.g., below 20 Hz or so) there is little benefit in the ANC system attempting to cancel these low frequencies anyway, but the unwanted noise/artifacts could be at a higher frequency and therefore can be perceived by the user.

One way to reduce the low-frequency vibration signal input to the ANC system is to apply a high-pass filter with a cutoff frequency of around 20 Hz as a part of the ANC control filter. However, the high-pass filter reduces the attenuation magnitude in the low frequencies, resulting in poor sound cancellation performance in these frequencies. Furthermore, the high-pass filter increases the group delay of the open loop transfer function of the ANC system, which reduces the attenuation bandwidth. Therefore, a high pass filter can have detrimental effects on acoustic noise cancellation performance.

As seen in FIG. 1, the ear-wearable device 100 includes one or more structural vibration sensors 116 designed to work with ANC processing. For purposes of this disclosure, the structural vibration sensor 116 can be distinguished from a microphone in that the structural vibration sensor 116 is adapted or configured to primarily detect non-airborne vibrations, such as vibrations conducted into the device housing via the ear canal 104 and other anatomical structures. The term "vibration sensor" may be used interchangeably with "structural vibration sensor" herein. The vibration sensor 116 may include any combination of a piezoelectric accelerometer/transducer, gyroscope, eddy current detector, micro-electromechanical systems (MEMS) sensor, etc.

In some embodiments, the vibration sensor 116 outputs three orthogonal vibration signals, e.g., translational vibration corresponding the axes of an xyz-coordinate system. The vibration sensor 116 may also output rotational vibration signals, e.g., corresponding to three orthogonal axes of rotation. In some cases, the vibration sensor 116 may provide three rotational and three translational outputs, sometimes referred to as a six degree-of-freedom (6DOF) sensor. In other embodiments the 6DOF vibration measurements can be combined with a three-DOF (3DOF) magnetometer output (or other applicable sensor) to form what is known as a nine-DOF (9DOF) inertial measurement unit (IMU). Other combinations of 3DOF measurements may be combined to obtain a 6DOF or 9DOF measurement and not all of the six or nine degrees of freedom need to be orthogonal.

Generally, vibrations in the ear originate from a combination of up-down, left-right and front-rear movements. While walking-related vibrations might have a dominant up-down component, the same is not true for own-voice-related vibrations. The ear-wearable device can isolate vibrations generated by specific body vibration sources (walking, nodding, speaking, etc.) by using an M-input, N-output beamformer that processes the M>=1 different output signals of the vibration sensor and generates N>1 isolated vibration signals, one for each targeted body vibration source. In some embodiments, M>1, e.g., M=3 for a three-axis translational vibration sensor.

In FIG. 2, a block diagram shows an audio processing path 200 of an ear-wearable device according to an example embodiment. The external microphone 110 receives external sound 108 and produces an input audio signal 202 in response. A streaming multimedia source 204, e.g., from a digital audio player, may be combined with the input audio signal as indicated by block 206 to produce a combined input signal 207. Note that only one of these sources 110, 204 may be used in the ear-wearable device.

The combined input signal 207 is processed by a hearing aid processor 208, which provides a processed signal 209 that may be conditioned, for example, to compensate for a hearing impairment of the user. This processor 208, for example, may apply processing to filter, equalize, compress, expand, amplify, etc., the combined input signal 207. For non-hearing aid applications, such as media playback, the processor 208 may apply similar or other processing, e.g., for enhancement of music, speech, etc.

An ANC processing section 220 is part of the processing path 200. At summation block 210, the processed signal 209 is combined with noise cancellation signal 211 that is an inverse of a noise signal at the ear drum estimated from the signal measured by the inward-facing microphone 114. The inward-facing microphone 114 provides an error signal 212, which is a combination of acoustic noise 214 (e.g., noise leaking in from outside the ear, own voice) and noise from the receiver 103 along the secondary path 105. Accordingly, a secondary path model 216 is used to provide an estimate 215 of sound from the secondary path 105. The estimate 215 of the secondary path is subtracted from the error signal 212 at summation block 217. An output 218 of the summation block 217 is processed via ANC filter 219, which calculates the noise cancellation signal 211.

As indicated in FIG. 2, the vibrations detected by the inward-facing microphone 114 can include both body-induced vibrations (dv_Body) and receiver-induced vibrations (dv_Rec), both of which can have detrimental effects on the ANC processor 220. Accordingly, a sensed vibration signal 222 from a structural vibration sensor 116 is structurally coupled to detect body-induced vibrations and/or receiver-induced vibrations and produce the vibration signal 222 in response. The vibration sensor 116 is mounted to an enclosure that fits in the ear, e.g., in the ear canal, and vibrations from the body are induced from the ear tissue to the enclosure and vibration sensor 116. Note that the description of body-induced and receiver-induced vibrations does not preclude the processing path 200 from being used to detect vibrations from other sources. In the description below, source-independent vibrations received at the ear-wearable device are indicated generally as d_v or d_v(n).

An ear-wearable device may be equipped with vibration sensors provided with multiple outputs, e.g., three output signals. Use of multiple (typically orthogonal) vibration signals recognizes that vibrations in the ear originate from combinations of up-down, left-right and front-rear movements. While walking-related vibrations might have a dominant up-down component, the same is not true for own-voice-related vibrations. Aiming at isolating vibrations generated by specific body vibration sources (walking, going up or down stairs, nodding, speaking, etc.) one embodiment uses a three-input-N-output beamformer that processes the three output signals of the vibration sensor and generates N-isolated vibration signals, e.g., one for each targeted body vibration source and/or receiver vibrations.

Figure 3:
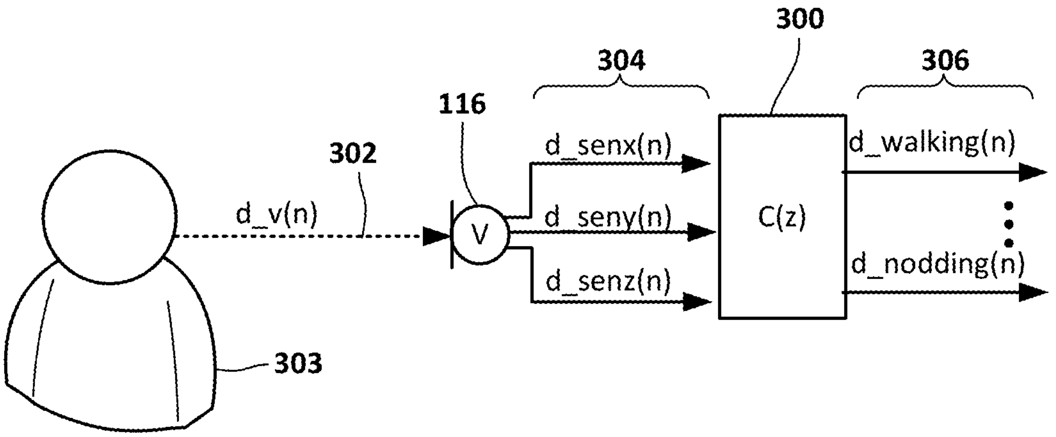
FIGS. 3 and 4 are block diagrams showing training of a vibration categorization model according to an example embodiment.

An example of this is shown in FIG. 3, in which a vibration sensor 116 provides three output signals 304 in response to a vibration input 302 detected in an ear of a user 303 of the device. In this case, the three output signals 304 correspond to the three different axes of the xyz-coordinate system. The vibration sensor 116 may provide more or fewer outputs 304 in some embodiments. As indicated by the suffix (n), the vibration output signals 304 are discrete, digitized, time-domain signals in this embodiment.

The vibration sensor signals 304 are input to a model 300, which may include a beamformer, a machine learning classifier, or the like. A beamformer detects/estimates a signal of interest at the output of a sensor by means of optimal (e.g., least-squares) spatial filtering and interference rejection. A machine learning classifier uses a learning model (e.g., recurrent neural network, hidden Markov model) that is trained using optimization techniques such as backpropagation and/or gradient descent. The machine learning classifier may be structured and trained to classify the N-types of vibration for suppression by other means (e.g., adaptive filter) or may be structured and trained to perform suppression.

The model 300 provides N-outputs 306, each associated with a separate category of vibration event. In one embodiment, the parameters of the multiple input, N-output model 300 are optimized over N steps during a calibration stage. In each one of the N steps of the calibration corresponding to one of the outputs 306, the subject is instructed to generate a specific body vibration. For instance, the subject may be instructed to walk for a predetermined distance or time while vibration measurements are gathered and used to characterize/classify vibrations that are induced by walking. The same measurements can be repeated using various combinations of subjects (e.g., a select population) and device configurations for each type of vibration gathered. Other training techniques, such as use of training and validation sets, augmented training data (e.g., adding random noise, changing time scales, etc.) can be used to further validate and refine the model 300. This type of training can also be used to learn and characterize receiver vibrations, e.g., based on a fitted device that is subject to a variety of audio inputs.

Figure 4:
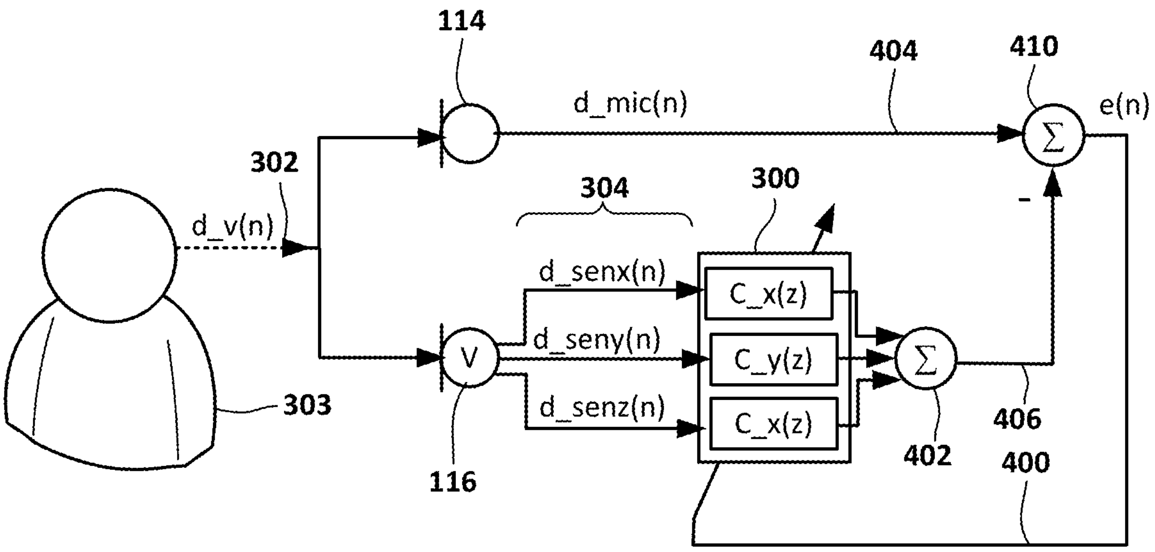

In FIG. 4, a diagram shows how the parameters of the filters C_x, C_y and C_z are optimized by least squares minimization of the error signal 400. As indicated by summation block 402, the different components (x, y, and z in this example) are jointly optimized. A microphone output signal 404 from the inward-facing microphone 114 can also be used for the optimization. In this example, the optimization involves subtracting the vibration signal 406 from the inward-facing microphone signal 404 at block 410 to avoid receiver overdrive. The optimized C_x, C_y and C_z filters are stored as C_{x, walking}, C_{y, walking} and C_{z, walking} for the walking channel in the beamformer. Subsequently, the subject is instructed to generate the second specific body vibration, for instance by nodding. The optimal filters are stored as C_{x, nodding}, C_{y, nodding} and C_{z, nodding} for nodding channel in the beamformer. The procedure is repeated until all N channels of the beamformer have been calibrated for their respective body vibrations and/or receiver vibrations.

In addition to the inward-facing microphone 114, a vibration sensor 116 is placed near the microphone 114 during the calibration to predict the vibration component in the output signal of the inward-facing microphone. Moreover, by subtracting the output of the vibration sensor 116 from the output of the inward-facing microphone 114 to obtain signal 400, only the component of the acoustic sound signal in the ear canal is input to the ANC system, e.g., via error signal 212 shown in FIG. 2. This subtraction prevents vibration signals from being input into the ANC feedback loop. It thereby avoids the output of large amplitude signals due to walking, chewing, head shaking, etc., to the receiver. As a result, distortion noises due to the receiver saturation and/or artifacts caused by underperformance of output power supply of receiver can be avoided without sacrificing acoustic noise cancellation performance.

Figure 5:
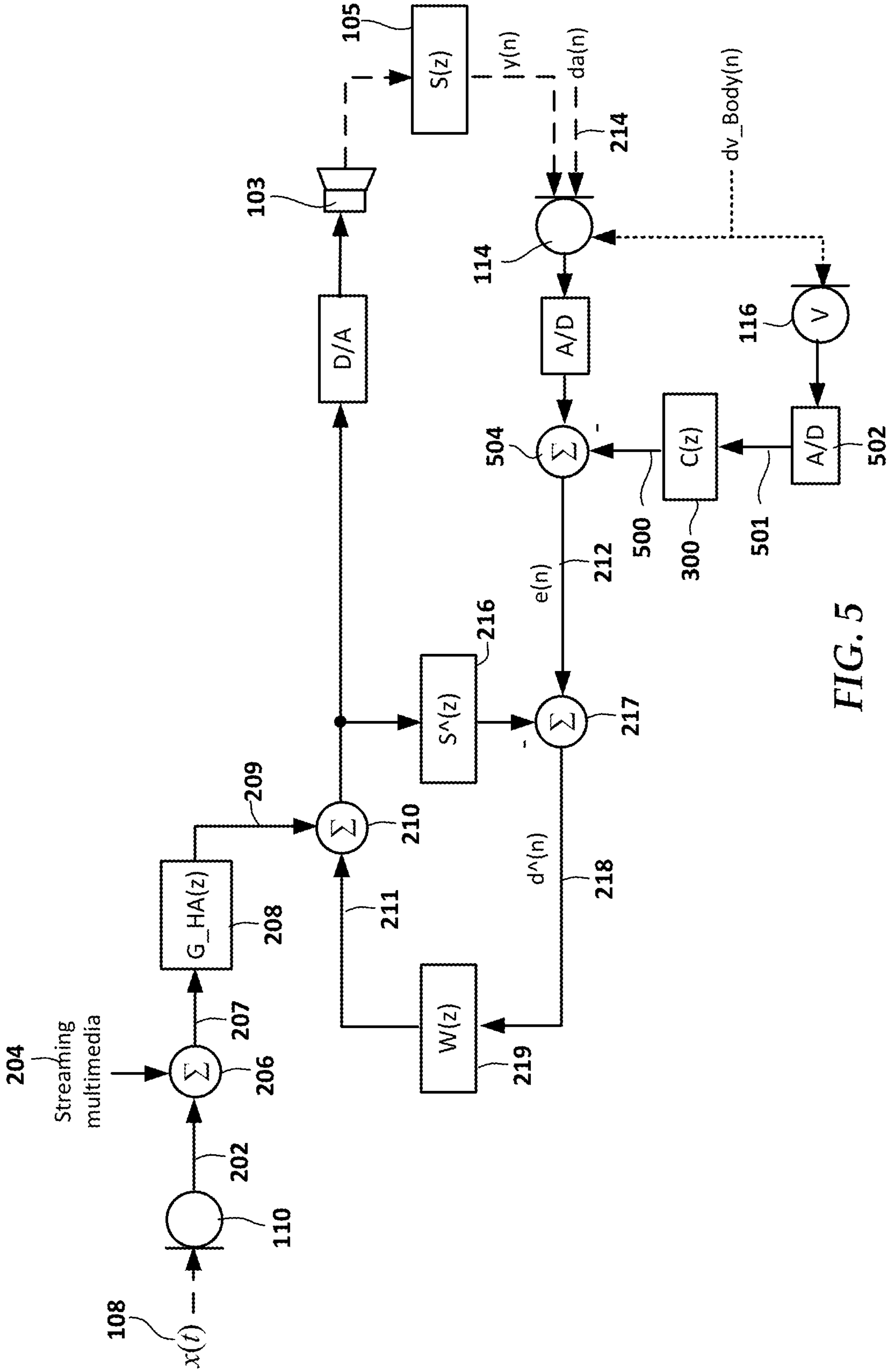
FIGS. 5-9 are block diagrams of active noise cancellation processing paths according to various example embodiments.

An adjustment gain controller and/or frequency-shaping filter C(z) may be used to compensate the vibration sensitivity difference between the vibration sensor and inward-facing microphone. In FIG. 5, a block diagram shows the use of a characterization model 300 (e.g., a beamformer or frequency-shaping filter) with a vibration sensor 116 according to an example embodiment. The processing path shown in FIG. 5 includes analogous components as shown and described in FIG. 2, and so the same reference numbers are used. An output signal 501 of the vibration sensor 116 is input to the characterization model 300 after analog-to-digital (A/D) conversion, as indicated by digitized signal 501 from A/D converter 502. The model 300 provides a vibration-cancelling output 500 that is subtracted from the inward-facing microphone signal at subtraction block 504. The resulting error signal 212 will have the vibration components removed before further ANC processing.

Figure 6:
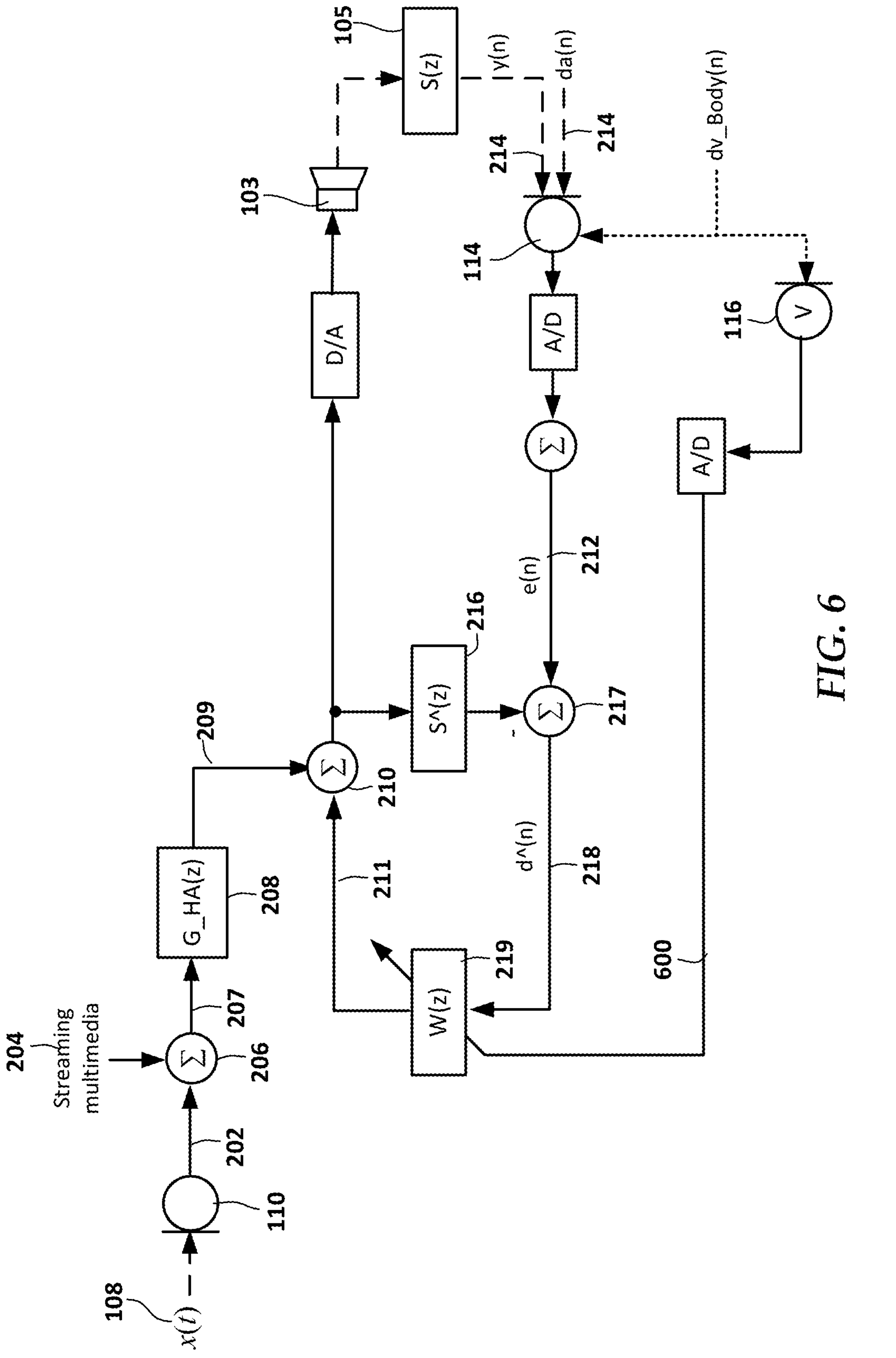

In FIG. 6, a block diagram shows the use of a vibration sensor 116 according to another example embodiment. As indicated by path 600, the signal from vibration sensor 116 is used to adjust parameters of the ANC filter 219. This embodiment manages or colors the noise by optimizing ANC filter W(z) without mitigating the noise at low frequencies as shown in FIG. 5. The sound processing circuit can provide the effect of a more pleasing residual output in terms of wideband loudness. Note that the approach shown in FIG. 6 can be combined with the approach shown in FIG. 5, e.g., by jointly optimizing the model 300 and parameters of the ANC filter 219.

In addition to human movements, the receiver 103 could be one of the vibration sources for the ANC system. Because the inward-facing microphone 114 is typically placed close to the receiver 103, the microphone 114 could be affected by the vibration of the receiver 103 (see dv_Rec in FIG. 2). In this case, the vibration sensor 116 could be placed next to the receiver 103 to pick up the vibration, e.g., in close physical proximity with strong structural coupling therebetween. Embodiments which account for receiver vibrations are shown respectively in the block diagrams of FIGS. 7 and 8. The embodiments shown in FIG. 7 uses a model 300 as in FIG. 5 to detect and suppress vibration sensor signals, although might be trained and configured differently for receiver-originated vibrations. The embodiment shown in FIG. 8 uses the vibration sensor signal 600 to adjust the ANC filter 219 in a similar way as shown in FIG. 6, although be tuned for dv_Rec the parameters of the ANC filter may be affected differently in the arrangement of FIG. 8. The vibration detected by vibration sensor 116 in both FIGS. 7 and 8 is labeled as dv_Rec^ to indicate it is an estimate of the vibration (dv_Rec) affecting the inward facing microphone 114.

Figure 7:
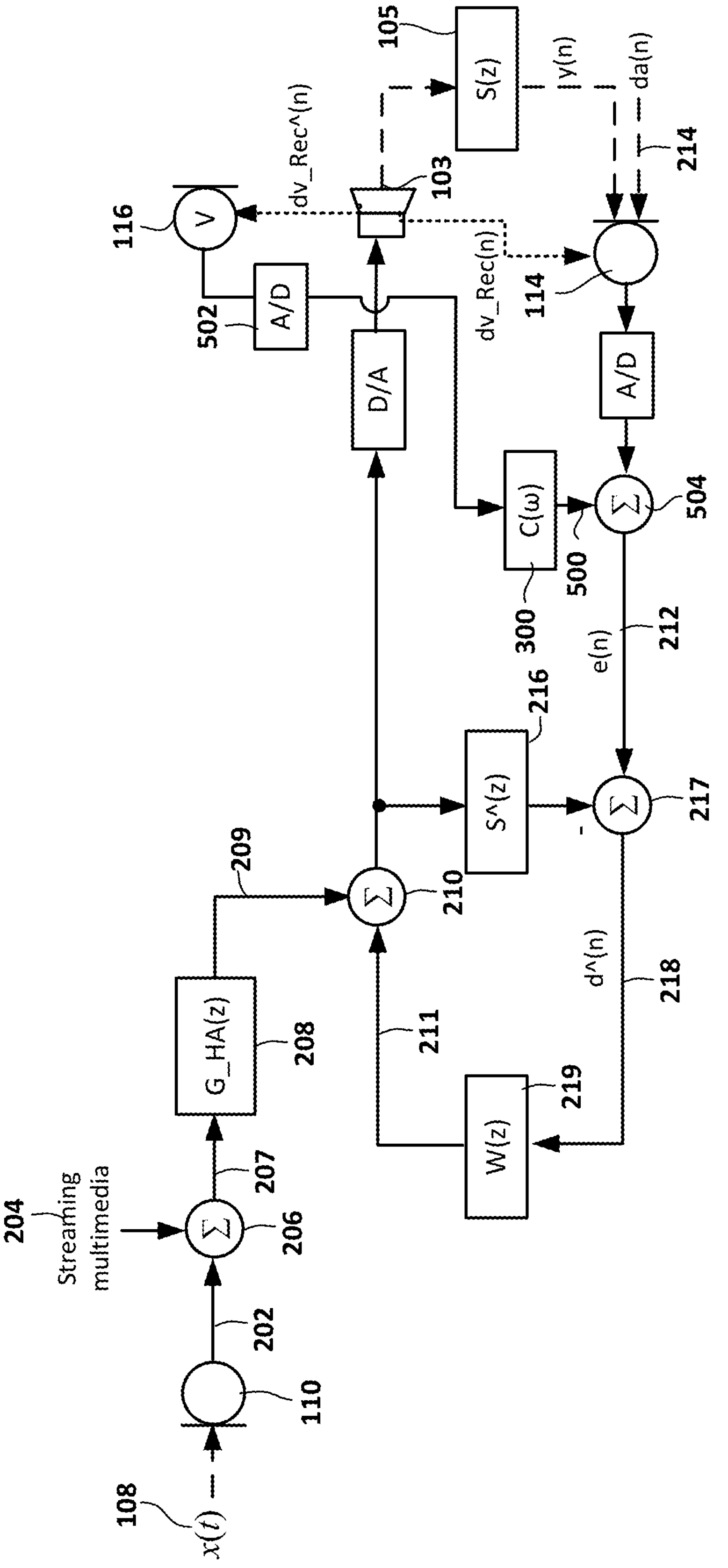
Figure 8:
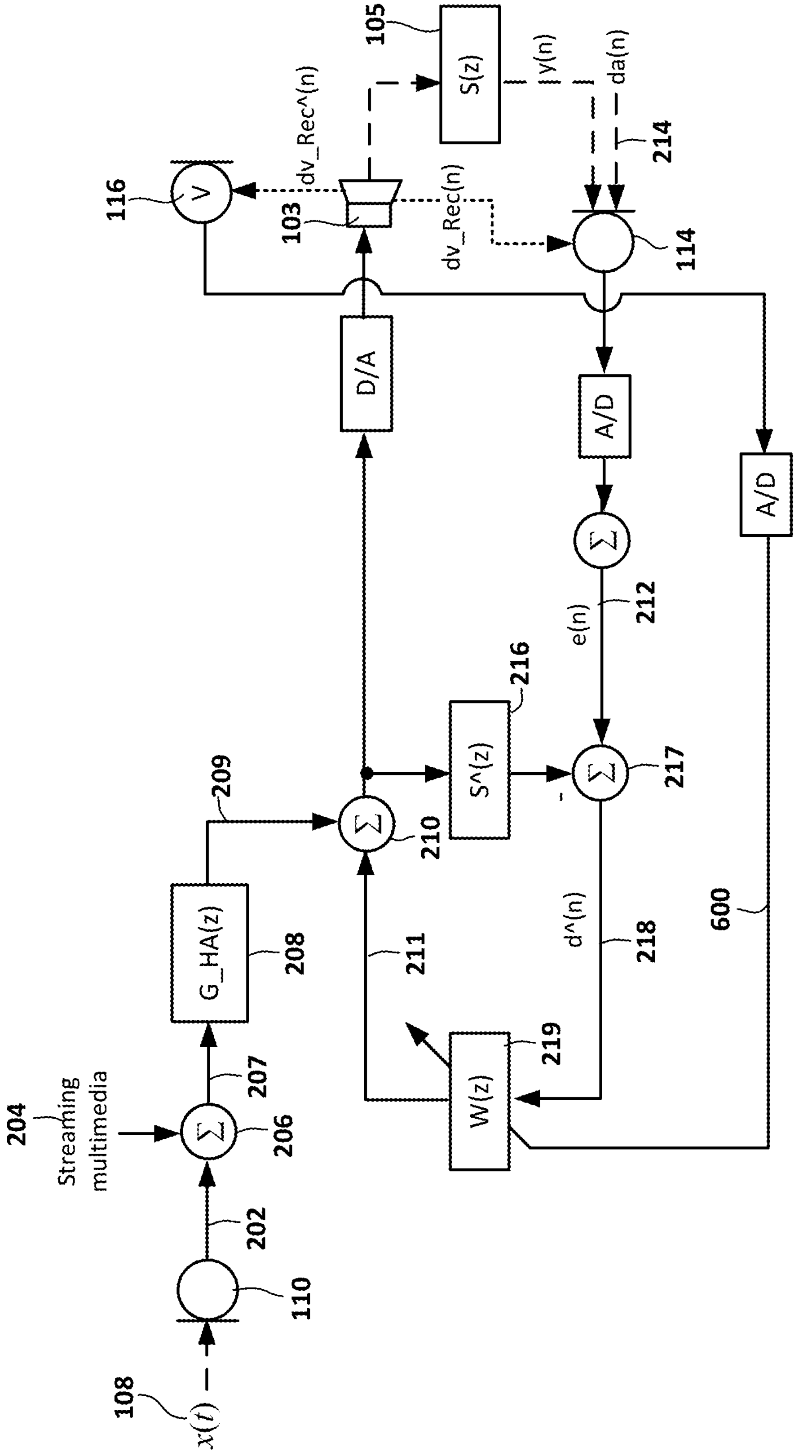

The embodiments shown in FIGS. 5 and 6 can be combined with the embodiments shown in FIGS. 7 and 8. For example, two or more vibration sensors 116 could be used to sense different vibration types (e.g., dv_Body and dv_Rec). In one embodiment, a first vibration sensor 116 picks up a first signal that is mainly dominated by the human-body-induced vibration, and a second vibration sensor 116 picks up a second signal that is mainly dominated by the receiver-induced vibration. The two or more vibration sensors 116 may share some common components, such as IMU data obtained from another sensor (e.g., magnetometer), analog front end, signal processing circuits, etc. The signals from the two vibration sensors can be used separately or combined to form estimations of the body-induced and receiver-induced vibrations. The estimated vibrations can independently be processed to separately address the artifacts that the body and receiver introduce.

Figure 9:
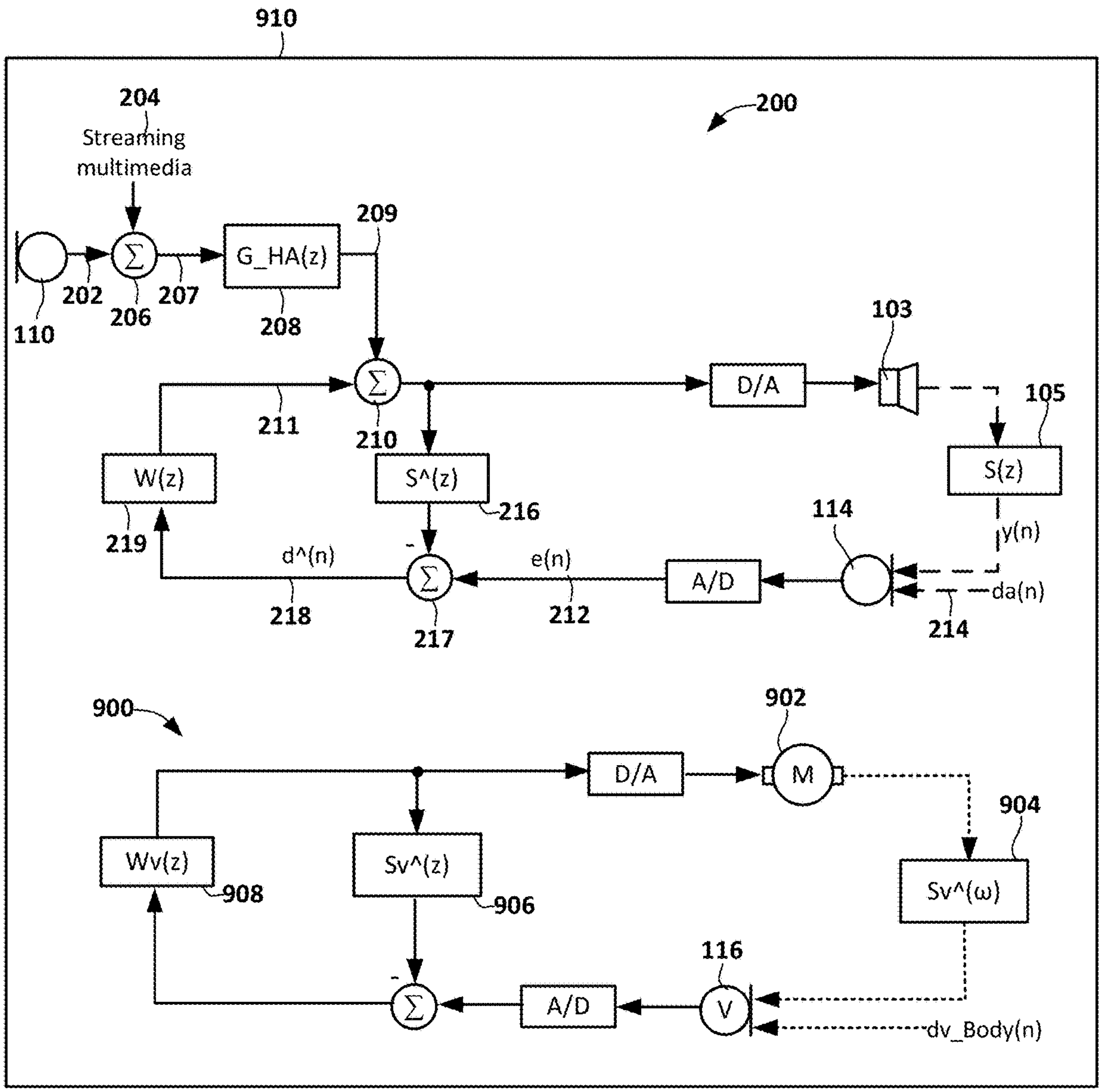

In FIG. 9, a diagram shows a vibration sensor 116 being used with ANC according to another example embodiment. As seen in FIG. 9, a dedicated vibration cancelling processing path 900 is separate from the audio processing path 200, the latter similar to what is shown in FIG. 2. The vibration cancelling path 900 includes a structural vibration actuator 902 and a vibration sensor 116 that are analogous to the respective receiver 103 and inward-facing microphone 114. Both processing paths 200, 900 and relevant hardware used in the processing are included on a common ear-wearable device 910. The structural vibration actuator 902 may include any combination of a motor actuator, piezo actuator, MEMs actuator, etc.

The output of the vibration sensor 116 is input to a vibration filter 908. Similar to the audio secondary path, a vibrational secondary path 904 exists between the vibration actuator 902 and vibration sensor 116. Thus the vibration cancelling path 900 also includes a secondary path model 906 in order to prevent issues with vibration cancelling similar to ANC secondary path coupling. The vibration cancelling path 900 is intended to help prevent the inward-facing microphone 114 from picking up the vibration component, thus further improving cancellation performance and reducing unwanted noise/artifacts.

An additional vibration sensor can be used to reduce the components of low-frequency human body vibration or vibration from a receiver in the inward-facing microphone signal, aiming at reducing artifacts produced by high-level low-frequency output signals. Vibration detection can mitigate the noise/artifacts due to the human body vibrations or vibration from a receiver without sacrificing ANC acoustic noise cancellation performance.

Figure 10A:
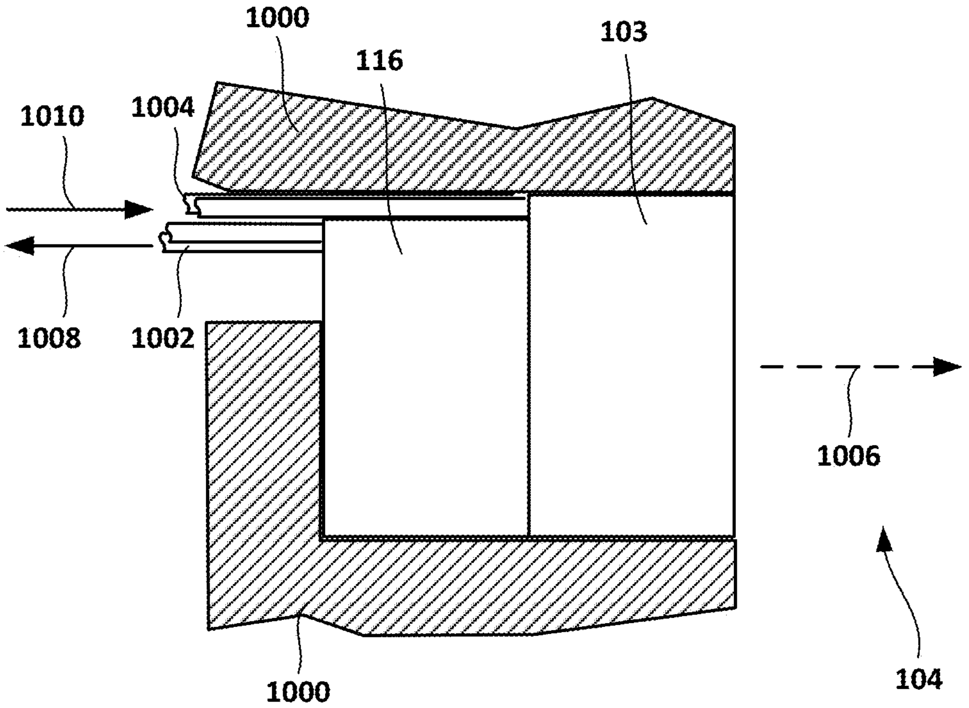
FIGS. 10A and 10B are block diagrams of vibration sensor mounting arrangements according to example embodiments.

In FIG. 10A, a diagram shows a mounting arrangement of a vibration sensor 116 according to an example embodiment. The vibration sensor 116 is located in close proximity (e.g., in direct contact with) the acoustic transducer 103. The vibration sensor 116 and acoustic transducer 103 are commonly mounted within an enclosure 1000. The acoustic transducer 103 is outward facing such that sound 1006 can be efficiently coupled into the ear canal 104. Also seen in this view are conductor 1002, 1004 that carry respective vibrations sensor signals 1008 and receiver input signals 1010. The mounting arrangement shown in FIG. 10A may be suitable for the processing arrangement shown in FIGS. 7 and 8, where the vibration sensor 116 is coupled to estimate the vibration dv_Rec between the acoustic transducer 103 and the inward facing microphone 114.

Figure 10B:
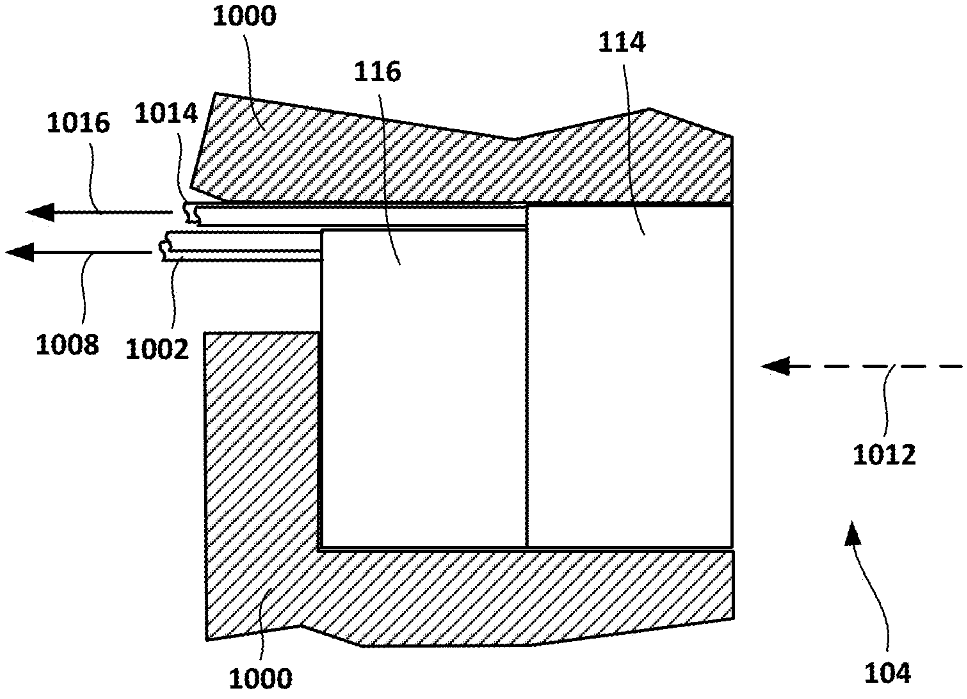

In FIG. 10B, a diagram shows a mounting arrangement of a vibrations sensor 116 according to another example embodiment. The vibration sensor 116 is located in close proximity (e.g., in direct contact with) the inward-facing microphone 114. The vibration sensor 116 and inward-facing microphone 114 are commonly mounted within an enclosure 1000, which could be the same enclosure as FIG. 10A or a different enclosure. The inward-facing microphone 114 is exposed to the ear canal 104 such that sound 1012 from the ear canal 104 can be coupled into the microphone 114. Also seen in this view are conductors 1002, 1014 that carry respective vibration sensor signals 1008 and error microphone signals 1016. The mounting arrangement shown in FIG. 10B may be suitable for the processing arrangement shown in FIGS. 5 and 6, where the vibration sensor 116 is coupled to estimate the vibration dv_Body between the user's body and the inward facing microphone 114. Note that arrangements shown in both FIGS. 10A and 10B could be used in the same device, with different vibration sensors used to separately detect/estimate dv_Rec and dv_Body.

Figure 11:
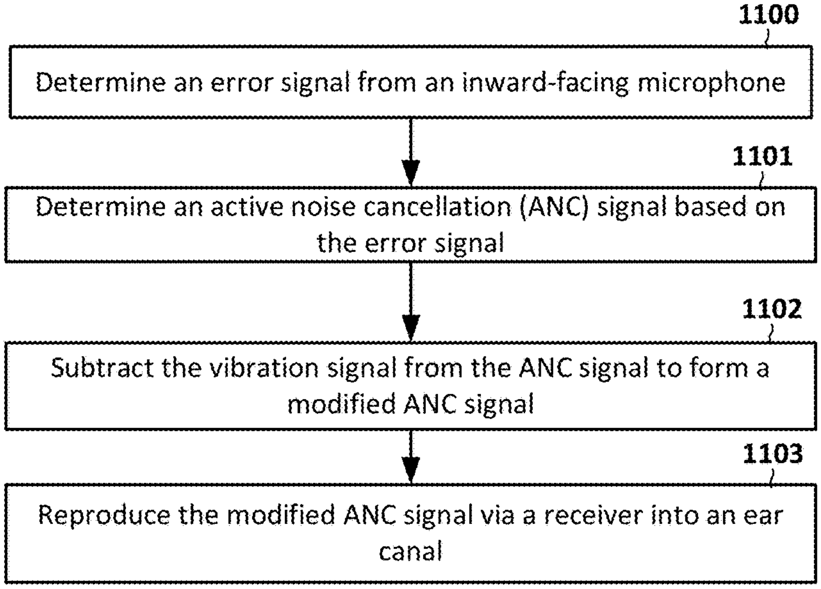
FIGS. 11, 12, 13A and 13B are flowcharts of methods according to example embodiments.

In FIG. 11, a flowchart shows a method according to an example embodiment. The method involves determining 1100 an error signal from an inward-facing microphone and determining 1101 an ANC signal (e.g., noise cancellation signal) based on the error signal. The vibration signal is subtracted 1102 from the ANC signal to form a modified ANC signal. The modified ANC signal is reproduced 1103 via the receiver into the ear canal.

Figure 12:
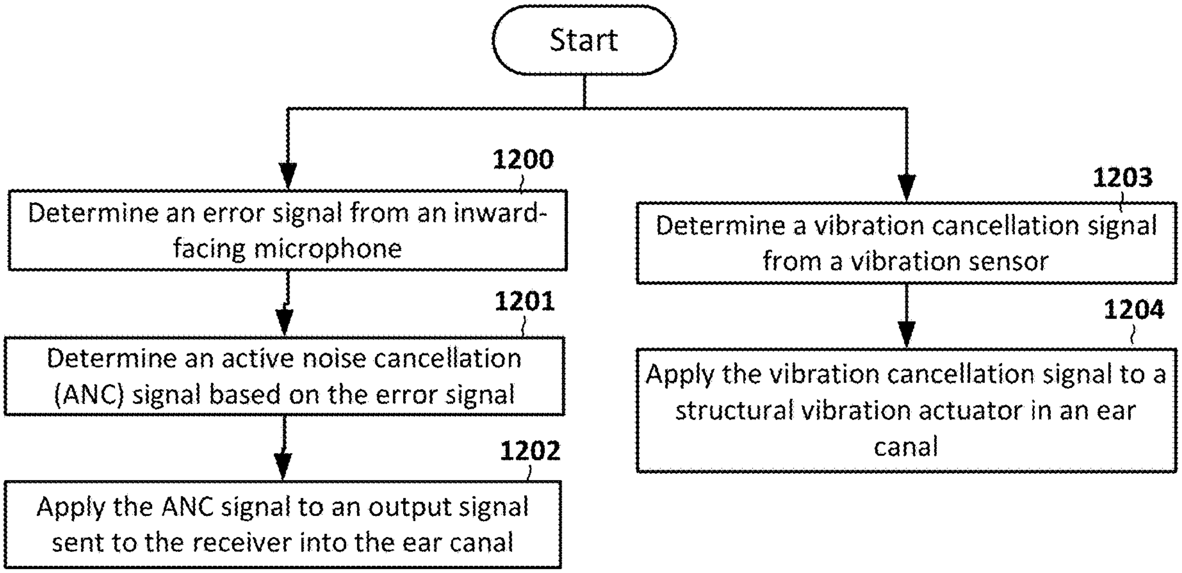

In FIG. 12, a flowchart shows a method according to another example embodiment. An ANC processing part of the method involves determining 1200 an error signal from an inward-facing microphone and determining 1201 an ANC signal (e.g., noise cancellation signal) based on the error signal. The ANC signal is applied 1202 to an output signal sent to the receiver into the ear canal. In parallel with the ANC processing, a vibration cancellation signal is determined 1203 from a vibration sensor. The vibration cancellation signal is applied 1204 to a structural vibration actuator in an ear canal.

Figure 13A:
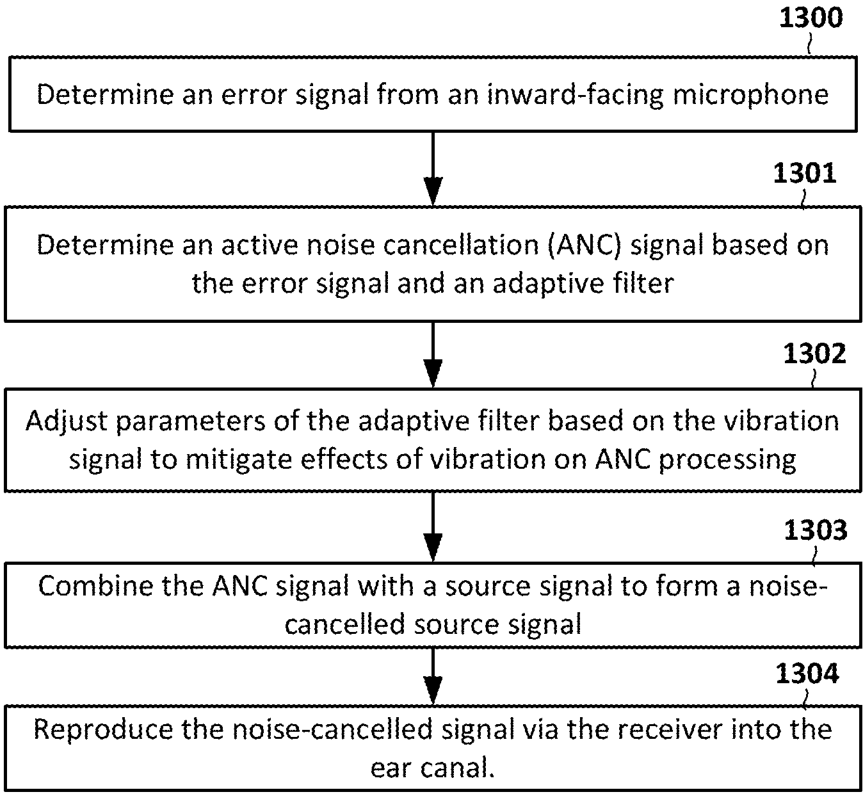

In FIG. 13A, a flowchart shows a method according to another example embodiment. The method involves determining 1300 an error signal from an inward-facing microphone and determining 1301 an ANC signal (e.g., noise cancellation signal) based on the error signal and an adaptive filter. Parameters of the adaptive filter are adjusted 1302 based on the vibration signal to mitigate effects of vibration on ANC processing. The modified ANC signal is combined 1303 with a source signal to form a noise-cancelled source signal. The noise-cancelled signal is reproduced 1304 via the receiver into the ear canal.

Figure 13B:
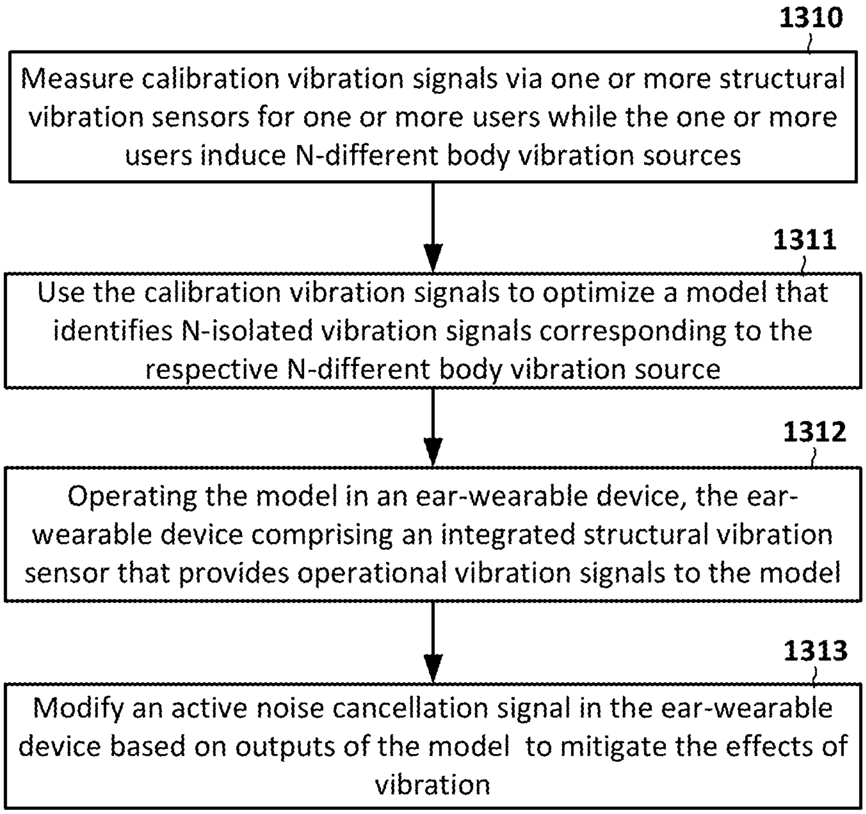

In FIG. 13B, a flowchart shows a method according to another example embodiment. The method involves measuring 1310 calibration vibration signals via one or more structural vibration sensors for one or more users while the one or more users induce N-different body vibration sources. The calibration vibration signals are used to optimize 1311 a model that identifies N-isolated vibration signals corresponding to the respective N-different body vibration sources. The model is operated 1312 in an ear-wearable device, the ear-wearable device comprising an integrated structural vibration sensor that provides operational vibration signals to the model. The model provides an output in response to the operational vibration signals. An ANC signal in the ear-wearable device is modified 1313 based on the output of the model to mitigate the effects of vibration on ANC processing.

Figure 14:
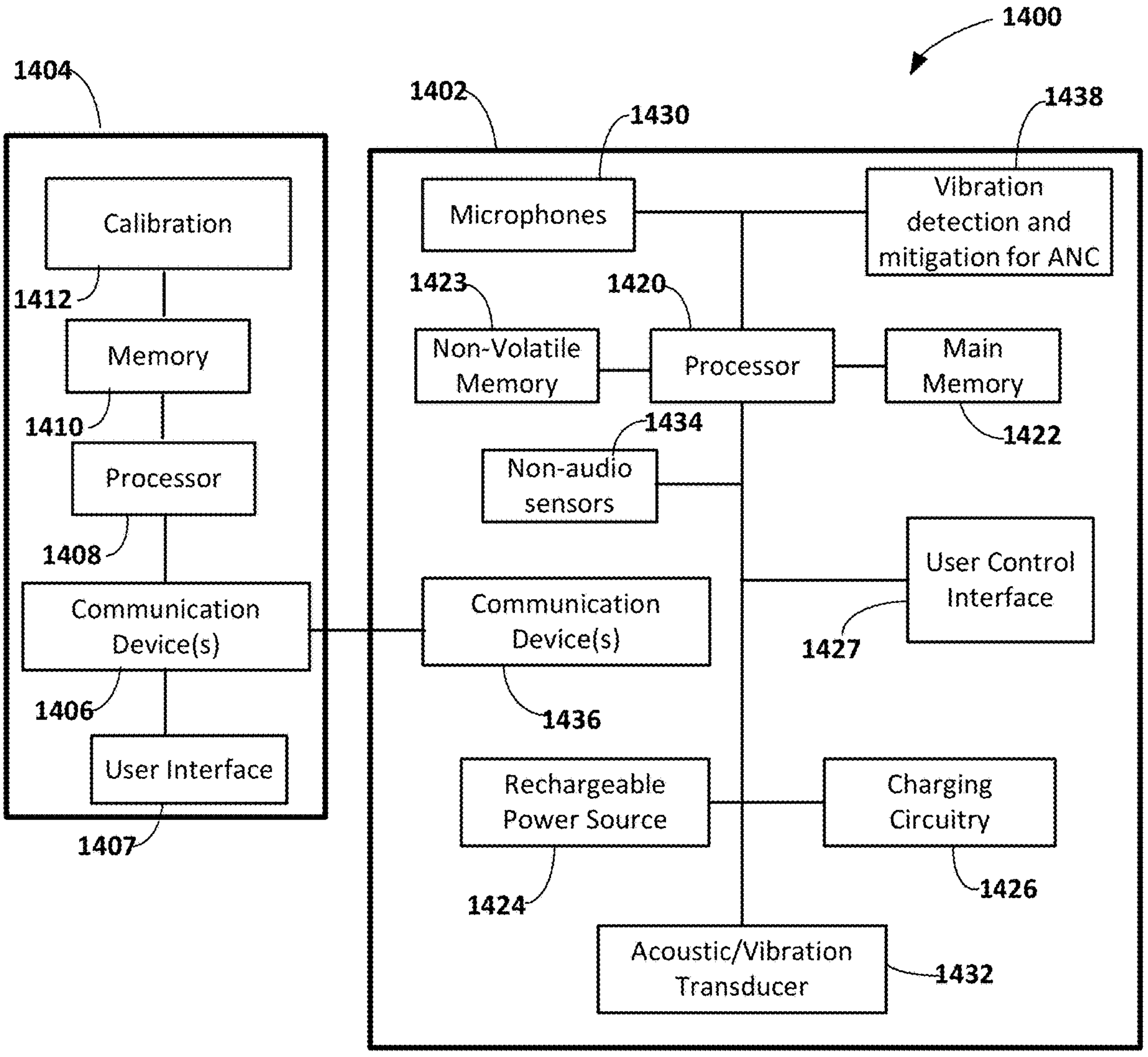
FIG. 14 is a block diagram of a hearing device and system according to an example embodiment.

In FIG. 14, a block diagram illustrates a system and ear-worn hearing device 1400 in accordance with any of the embodiments disclosed herein. The hearing device 1400 includes a housing 1402 configured to be worn in, on, or about an ear of a wearer. The hearing device 1400 shown in FIG. 14 can represent a single hearing device configured for monaural or single-ear operation or one of a pair of hearing devices configured for binaural or dual-ear operation. The hearing device 1400 shown in FIG. 14 includes a housing 1402 within or on which various components are situated or supported. The housing 1402 can be configured for deployment on a wearer's ear (e.g., a behind-the-ear device housing), within an ear canal of the wearer's ear (e.g., an in-the-ear, in-the-canal, invisible-in-canal, or completely-in-the-canal device housing) or both on and in a wearer's ear (e.g., a receiver-in-canal or receiver-in-the-ear device housing).

The hearing device 1400 includes a processor 1420 operatively coupled to a main memory 1422 and a non-volatile memory 1423. The processor 1420 can be implemented as one or more of a multi-core processor, a digital signal processor (DSP), a microprocessor, a programmable controller, a general-purpose computer, a special-purpose computer, a hardware controller, a software controller, a combined hardware and software device, such as a programmable logic controller, and a programmable logic device (e.g., FPGA, ASIC). The processor 1420 can include or be operatively coupled to main memory 1422, such as RAM (e.g., DRAM, SRAM). The processor 1420 can include or be operatively coupled to non-volatile (persistent) memory 1423, such as ROM, EPROM, EEPROM or flash memory. As will be described in detail hereinbelow, the non-volatile memory 1423 is configured to store instructions (e.g., module 1438) that detect and mitigate vibrations for ANC subsystems.

The hearing device 1400 includes an audio processing facility operably coupled to, or incorporating, the processor 1420. The audio processing facility includes audio signal processing circuitry (e.g., analog front-end, analog-to-digital converter, digital-to-analog converter, DSP, and various analog and digital filters), a microphone arrangement 1430, and an acoustic/vibration transducer 1432 (e.g., loudspeaker, receiver, bone conduction transducer, motor actuator). The microphone arrangement 1430 can include one or more discrete microphones or a microphone array(s) (e.g., configured for microphone array beamforming). Each of the microphones of the microphone arrangement 1430 can be situated at different locations of the housing 1402. It is understood that the term microphone used herein can refer to a single microphone or multiple microphones unless specified otherwise.

At least one of the microphones 1430 may be configured as a reference microphone producing a reference signal in response to external sound outside an ear canal of a user. Another of the microphones 1430 may be configured as an error microphone producing an error signal in response to sound inside of the ear canal. The acoustic transducer 1432 produces amplified sound inside of the ear canal.

The hearing device 1400 may also include a user interface with a user control interface 1427 operatively coupled to the processor 1420. The user control interface 1427 is configured to receive an input from the wearer of the hearing device 1400. The input from the wearer can be any type of user input, such as a touch input, a gesture input, or a voice input. The user control interface 1427 may be configured to receive an input from the wearer of the hearing device 1400.

The hearing device 1400 also includes a vibration detection and mitigation module 1438 operably coupled to the processor 1420. The module 1438 can be implemented in software, hardware (e.g., specialized neural network logic circuitry, general purpose processor), or a combination of hardware and software. During operation of the hearing device 1400, the module 1438 can be used to detect body-induced and/or receiver-induced vibrations, the detected vibrations being used to mitigate vibration impacts to an ANC processor as described above. The vibration signals are received from a vibration sensor, which is included with non-audio sensors 1434.

The hearing device 1400 can include one or more communication devices 1436. For example, the one or more communication devices 1436 can include one or more radios coupled to one or more antenna arrangements that conform to an IEEE 802.14 (e.g., Wi-Fi®) or Bluetooth® (e.g., BLE, Bluetooth® 4.2, 5.0, 5.1, 5.2 or later) specification, for example. In addition, or alternatively, the hearing device 1400 can include a near-field magnetic induction (NFMI) sensor (e.g., an NFMI transceiver coupled to a magnetic antenna) for effecting short-range communications (e.g., ear-to-ear communications, ear-to-kiosk communications). The communications device 1436 may also include wired communications, e.g., universal serial bus (USB) and the like.

The communication device 1436 is operable to allow the hearing device 1400 to communicate with an external computing device 1404, e.g., a smartphone, laptop computer, etc. The external computing device 1404 includes a communications device 1406 that is compatible with the communications device 1436 for point-to-point or network communications. The external computing device 1404 includes its own processor 1408 and memory 1410, the latter which may encompass both volatile and non-volatile memory. The external computing device 1404 includes a calibration module 1412 that may be used to train or refine the models used by the ANC vibration mitigation module 1438. A user interface 1407 facilitates these and other interactions between the external computing device 1404 and the hearing device 1400.

The hearing device 1400 also includes a power source, which can be a conventional battery, a rechargeable battery (e.g., a lithium-ion battery), or a power source comprising a supercapacitor. In the embodiment shown in FIG. 14, the hearing device 1400 includes a rechargeable power source 1424 which is operably coupled to power management circuitry for supplying power to various components of the hearing device 1400. The rechargeable power source 1424 is coupled to charging circuitry 1426. The charging circuitry 1426 is electrically coupled to charging contacts on the housing 1402 which are configured to electrically couple to corresponding charging contacts of a charging unit when the hearing device 1400 is placed in the charging unit.

This document discloses numerous example embodiments, including but not limited to the following:

Example 1 is an ear-wearable device comprising: a receiver that reproduces sound into an ear canal; an inward-facing microphone determining sound pressure resulting from: the sound reproduced by the receiver into the ear canal; and acoustical noise leaking into the ear canal; a structural vibration sensor structurally coupled to detect at least one of body-induced vibrations and receiver-induced vibrations and produce a sensed vibration signal in response; and a sound processor operatively coupled to the receiver, the inward-facing microphone, and the structural vibration sensor, the sound processor operable to perform: determining an error signal from the inward-facing microphone; calculating an active noise cancellation (ANC) signal based on the error signal; subtracting the vibration signal from the ANC signal to form a modified ANC signal; and reproducing the modified ANC signal via the receiver into the ear canal.

Example 2 includes the ear-wearable device of example 1, wherein subtracting the vibration signal from the ANC signal comprises applying a frequency shaping filter to the vibration signal to identify and compensate for a body vibration source. Example 3 includes the ear-wearable device of example 1 or 2, wherein the sensed vibration signal is subtracted from an output of the inward-facing microphone. Example 4 includes the ear-wearable device of any one of examples 1-3, further comprising an external microphone coupled to the sound processor, the external microphone producing an external source signal, the external source signal reproduced together with the modified ANC signal via the receiver. Example 5 includes the ear-wearable device of example 4, wherein the sound processor modifies the external source signal to compensate for a hearing impairment of a user of the ear-wearable device.

Example 6 includes the ear-wearable device of any one of examples 1-5, wherein the error signal is adjusted based on an estimation of a secondary path in the ear canal. Example 7 includes the ear-wearable device of any one of examples 1-6, wherein the ear-wearable device comprises a memory storing a beamformer with a plurality of outputs, wherein the sensed vibration signal is input to the beamformer, the plurality of outputs corresponding to different isolated vibration signals. Example 8 includes the ear-wearable device of example 7, wherein the different isolated vibration signals are respectively associated with different body vibration sources.

Example 9 includes the ear-wearable device of example 7 or 8, wherein the sensed vibration signal comprises three orthogonal vibration signals that are input to the beamformer. Example 10 includes the ear-wearable device of example 9, wherein the beamformer stores, for each of the plurality of outputs, sets of three optimized filters, each of the three optimized filters associated with a respective one of the three orthogonal vibration signals. Example 11 includes the ear-wearable device of example 10, wherein one of the sets of three optimized filters is selected based on detecting a body vibration source for which the selected set of filters is optimized, the selected set of filters being used as a frequency shaping filter applied to the vibration signal. Example 12 includes the ear-wearable device of any one of examples 8-11, wherein the beamformer is calibrated by measuring calibration vibration signals for one or more users while the one or more users induce the different body vibration sources.

Example 13 includes the ear-wearable device of any one of examples 1-13, wherein the structural vibration sensor comprises an inertial measurement unit that outputs at least vibration measurements from three axes. Example 14 includes the ear-wearable device of example 13, wherein the inertial measurement unit provides six-degree-of-freedom vibration measurements. Example 15 includes the ear-wearable device of example 13, wherein the inertial measurement unit provides nine-degree-of-freedom vibration measurements.

Example 16 includes the ear-wearable device of any one of examples 1-15, wherein the structural vibration sensor is mounted proximate to the inward-facing microphone, and wherein modifying of the ANC signal based on the sensed vibration signal further comprises compensating for a vibration sensitivity difference between the structural vibration sensor and the inward-facing microphone. Example 17 includes the ear-wearable device of any one of examples 1-15, wherein the structural vibration sensor is mounted proximate to the receiver, the modifying of the ANC signal based on the sensed vibration signal further comprises compensating for a vibration sensitivity difference between the structural vibration sensor and the receiver. Example 18 includes the ear-wearable device of any one of examples 1-15, wherein the structural vibration sensor is mounted away from the receiver to detect the body-induced vibrations, the ear-wearable device further comprising a second structural vibration sensor mounted proximate the receiver to detect the receiver-induced vibrations, the ANC signal being further modified based on a vibration sensitivity difference between the second structural vibration sensor and the receiver.

Example 19 is an ear-wearable device comprising: a receiver that reproduces sound into an ear canal; an inward-facing microphone determining sound pressure resulting from: the sound reproduced by the receiver into the ear canal; and acoustical noise leaking into the ear canal; a structural vibration sensor structurally coupled to detect at least one of body-induced vibrations and receiver induced vibrations and produce a sensed vibration signal in response; and a sound processor coupled to the receiver, the inward-facing microphone, and the structural vibration sensor, the sound processor operable to perform: determining an error signal from the inward-facing microphone; determining an active noise cancellation (ANC) signal based on the error signal and an adaptive filter; adjusting parameters of the adaptive filter based on the vibration signal to mitigate effects of vibration on ANC processing; and reproducing the ANC signal via the receiver into the ear canal.

Example 20 includes the ear-wearable device of example 19, further comprising an external microphone coupled to the sound processor, the external microphone producing an external source signal, the external source signal reproduced together with the ANC signal via the receiver. Example 21 includes the ear-wearable device of example 20, wherein the sound processor modifies the external source signal to compensate for a hearing impairment of a user of the ear-wearable device. Example 22 includes the ear-wearable device of any one of examples 19-21, wherein the error signal is adjusted based on an estimation of a secondary path in the ear canal.

Example 23 includes the ear-wearable device of any one of examples 19-22, wherein the structural vibration sensor is mounted proximate the inward-facing microphone, and wherein the ANC signal is modified to compensate for a vibration sensitivity difference between the structural vibration sensor and the inward-facing microphone. Example 24 includes the ear-wearable device of any one of examples 19-22, wherein the structural vibration sensor is mounted proximate the receiver, and wherein the ANC signal is modified to compensate for a vibration sensitivity difference between the structural vibration sensor and the receiver. Example 25 includes the ear-wearable device of any one of examples 19-22, wherein the structural vibration sensor is mounted away from the receiver to detect the body-induced vibrations, the ear-wearable device further comprising a second structural vibration sensor mounted proximate the receiver to detect the receiver-induced vibrations, the ANC signal being modified based on a vibration sensitivity difference between the second structural vibration sensor and the receiver.

Example 26 is an ear-wearable device comprising: a receiver that reproduces sound into an ear canal; an inward-facing microphone determining sound pressure resulting from: the sound reproduced by the receiver into the ear canal; and acoustical noise leaking into the ear canal; a structural vibration sensor structurally coupled to detect at least one of body-induced vibrations and receiver-induced vibrations and produce a sensed vibration signal in response; a structural vibration actuator; and one or more processors coupled to the receiver, the inward-facing microphone, the structural vibration sensor, and the structural vibration actuator, the one or more processors operable to perform: determining an error signal from the inward-facing microphone; determining an active noise cancellation (ANC) signal based on the error signal; applying the ANC signal to an output signal sent to the receiver into the ear canal; determining a vibration cancellation signal based on the vibration signal; and applying the vibration cancellation signal to the structural vibration actuator.

Example 27 includes the ear-wearable device of example 26, further comprising an external microphone coupled to the sound processor and producing an external source signal based on an external source, the external source signal reproduced together with the modified ANC signal via the receiver. Example 28 includes the ear-wearable device of example 27, wherein the sound processor reproduces the external source signal via the receiver in the ear canal, the error signal adjusted based on an estimation of a secondary path in the ear canal. Example 29 includes the ear-wearable device of example 27 or 28, wherein the sound processor modifies the external source signal to compensate for a hearing impairment of a user of the ear-wearable device.

Example 30 includes the ear-wearable device of any one of examples 26-29, wherein the structural vibration sensor comprises a three-axis inertial measurement unit.

Example 31 is a method, comprising: measuring calibration vibration signals via one or more structural vibration sensors for one or more users while the one or more users induce N-different body vibration sources; using the calibration vibration signals to optimize a model that identifies N-isolated vibration signals corresponding to the respective N-different body vibration sources; operating the model in an ear-wearable device, the ear-wearable device comprising an integrated structural vibration sensor that provides operational vibration signals to the model, the model providing an output in response to the operational vibration signals; and modifying an active noise cancellation (ANC) signal in the ear-wearable device based on the output of the model to mitigate effects of vibration of the ear-wearable device.

Example 32 includes the method of example 31, wherein the calibration vibration signals and the operational vibration signals comprise at least three-axis vibration signals. Example 33 includes the method of example 31 or 32, wherein the model comprises a beamformer that utilizes a different filter for each of the N-different body vibration sources. Example 34 includes the method of example 33, wherein each different filter comprises a set of three optimized filters associated with respective three-axis vibration signals.

Example 35 includes the method of any one of examples 31-34, wherein the model comprises a beamformer, and wherein optimizing the model comprises a least squares minimization of an error signal obtained from an inward-facing microphone. Example 36 includes the method of example any one of 31-35, wherein the one or more users comprises a test group of users, and wherein the model is optimized over the test group. Example 37 includes the method of example 36, further comprising optimizing the model for a user of the ear-wearable device via an individualized calibration after optimizing the model over the test group. Example 38 includes the method of any one of examples 31-37, wherein the one or more users comprises a user of the ear-wearable device.

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All references and publications cited herein are expressly incorporated herein by reference in their entirety into this disclosure, except to the extent they may directly contradict this disclosure. Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g., 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a radio chip may be operably coupled to an antenna element to provide a radio frequency electric signal for wireless communication).

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

The invention claimed is:

1. An ear-wearable device comprising:

a receiver that reproduces sound into an ear canal;

an inward-facing microphone determining sound pressure resulting from: the sound reproduced by the receiver into the ear canal; and acoustical noise leaking into the ear canal;

a structural vibration sensor structurally coupled to detect at least one of body-induced vibrations and receiver-induced vibrations and produce a sensed vibration signal in response; and a sound processor operatively coupled to the receiver, the inward-facing microphone, and the structural vibration sensor, the sound processor operable to perform:

determining an error signal from the inward-facing microphone;

calculating an active noise cancellation (ANC) signal based on the error signal;

subtracting the sensed vibration signal from the ANC signal to form a modified ANC signal; and reproducing the modified ANC signal via the receiver into the ear canal.

2. The ear-wearable device of claim 1, wherein subtracting the sensed vibration signal from the ANC signal comprises applying a frequency shaping filter to the vibration signal to identify and compensate for a body vibration source.

3. The ear-wearable device of claim 1, wherein the sensed vibration signal is subtracted from an output of the inward-facing microphone.

4. The ear-wearable device of claim 1, further comprising an external microphone coupled to the sound processor, the external microphone producing an external source signal, the external source signal reproduced together with the modified ANC signal via the receiver, wherein the sound processor modifies the external source signal to compensate for a hearing impairment of a user of the ear-wearable device.

5. The ear-wearable device of claim 1, wherein the error signal is adjusted based on an estimation of a secondary path in the ear canal.

6. The ear-wearable device of claim 1, wherein the ear-wearable device comprises a memory storing a beamformer with a plurality of outputs, wherein the sensed vibration signal is input to the beamformer, the plurality of outputs corresponding to different isolated vibration signals.

7. The ear-wearable device of claim 6, wherein the different isolated vibration signals are respectively associated with different body vibration sources.

8. The ear-wearable device of claim 7, wherein the beamformer is calibrated by measuring calibration vibration signals for one or more users while the one or more users induce the different body vibration sources.

9. The ear-wearable device of claim 6, wherein the sensed vibration signal comprises three orthogonal vibration signals that are input to the beamformer.

10. The ear-wearable device of claim 9, wherein the beamformer stores, for each of the plurality of outputs, sets of three optimized filters, each of the three optimized filters associated with a respective one of the three orthogonal vibration signals.

11. The ear-wearable device of claim 10, wherein one of the sets of three optimized filters is selected based on detecting a body vibration source for which the selected set of filters is optimized, the selected set of filters being used as a frequency shaping filter applied to the vibration signal.

12. The ear-wearable device of claim 1, wherein the structural vibration sensor comprises an inertial measurement unit that outputs at least vibration measurements from three axes.

13. The ear-wearable device of claim 12, wherein the inertial measurement unit provides six-degree-of-freedom vibration measurements or nine-degree-of-freedom vibration measurements.

14. The ear-wearable device of claim 1, wherein the structural vibration sensor is mounted proximate to the inward-facing microphone, and wherein modifying of the ANC signal based on the sensed vibration signal further comprises compensating for a vibration sensitivity difference between the structural vibration sensor and the inward-facing microphone.

15. The ear-wearable device of claim 1, wherein the structural vibration sensor is mounted proximate to the receiver, the modifying of the ANC signal based on the sensed vibration signal further comprises compensating for a vibration sensitivity difference between the structural vibration sensor and the receiver.

16. The ear-wearable device of claim 1, wherein the structural vibration sensor is mounted away from the receiver to detect the body-induced vibrations, the ear-wearable device further comprising a second structural vibration sensor mounted proximate the receiver to detect the receiver-induced vibrations, the ANC signal being further modified based on a vibration sensitivity difference between the second structural vibration sensor and the receiver.

* * * * *